United States Patent

[11] 3,569,752

[72] Inventor John Morgan Tomlinson
 Stafford, England
[21] Appl. No. 851,927
[22] Filed Aug. 21, 1969
[45] Patented Mar. 9, 1971
[73] Assignee The English Electric Company Limited
 London, England
[32] Priority Aug. 21, 1968
[33] Great Britain
[31] 40017/68

[54] LIQUID-COOLED DYNAMOELECTRIC MACHINE ROTOR
 6 Claims, 4 Drawing Figs.
[52] U.S. Cl. .................................................. 310/54,
 310/61, 310/270
[51] Int. Cl. .................................................. H02k 9/19
[50] Field of Search ........................................... 310/54, 61,
 64, 65, 194, 260, 270

[56] References Cited
UNITED STATES PATENTS

| | | | |
|---|---|---|---|
| 3,497,736 | 2/1970 | Cuny et al. .................... | 310/54 |
| 3,504,207 | 3/1970 | Tjernstrom .................... | 310/61X |
| 3,510,700 | 5/1970 | Grinchenko et al. .......... | 310/54 |
| 3,034,003 | 5/1962 | Seidner ........................... | 310/61 |

Primary Examiner—D. F. Duggan
Attorney—Misegades & Douglas

ABSTRACT: The specification describes a dynamoelectric machine rotor in which cooling liquid is conveyed to and from the rotor windings by way of ducts in the rotor shaft ends and a plurality of cooling liquid manifolds, each such manifold is disposed in the annular space between the outer surface of the rotor shaft end and the inner faces of the rotor winding end turns and is supported against packing members supported by the rotor winding end turns. Flexible elbow pipes which convey the liquid between the shaft end and the rotor winding end turns accommodates for the relative movement between the shaft end and the end turns.

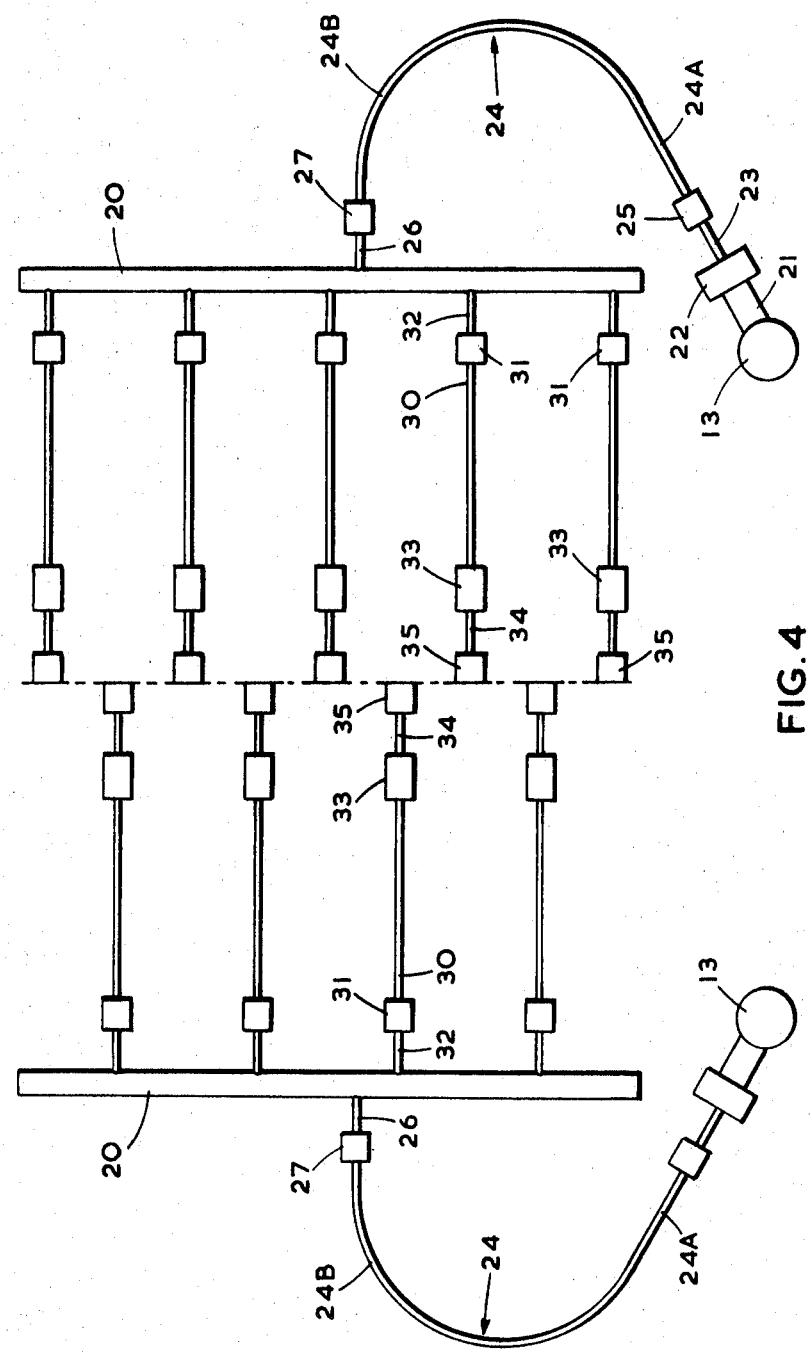

LIQUID-COOLED DYNAMOELECTRIC MACHINE ROTOR

This invention relates to a dynamoelectric machine rotor in which cooling liquid is conveyed to and from the rotor windings in liquid flow paths which include manifolds.

According to the invention there is provided a dynamoelectric machine rotor in which cooling liquid is conveyed to and from the rotor windings by way of ducts in the rotor shaft ends and a plurality of cooling liquid manifolds, in which each manifold is disposed in the annular space between the outer surface of the rotor shaft end and the inner faces of the rotor winding end turns and is supported against the rotor winding end turns.

In order that the invention may be better understood two embodiments and a modification thereof will now be described, by way of example, with reference to the accompanying drawings, in which:

FIG. 4 is a diagrammatic representation of the basic arrangement of FIGS. 1 to 3 and also diagrammatically shows the form of the liquid coolant manifold.

Figure 1:
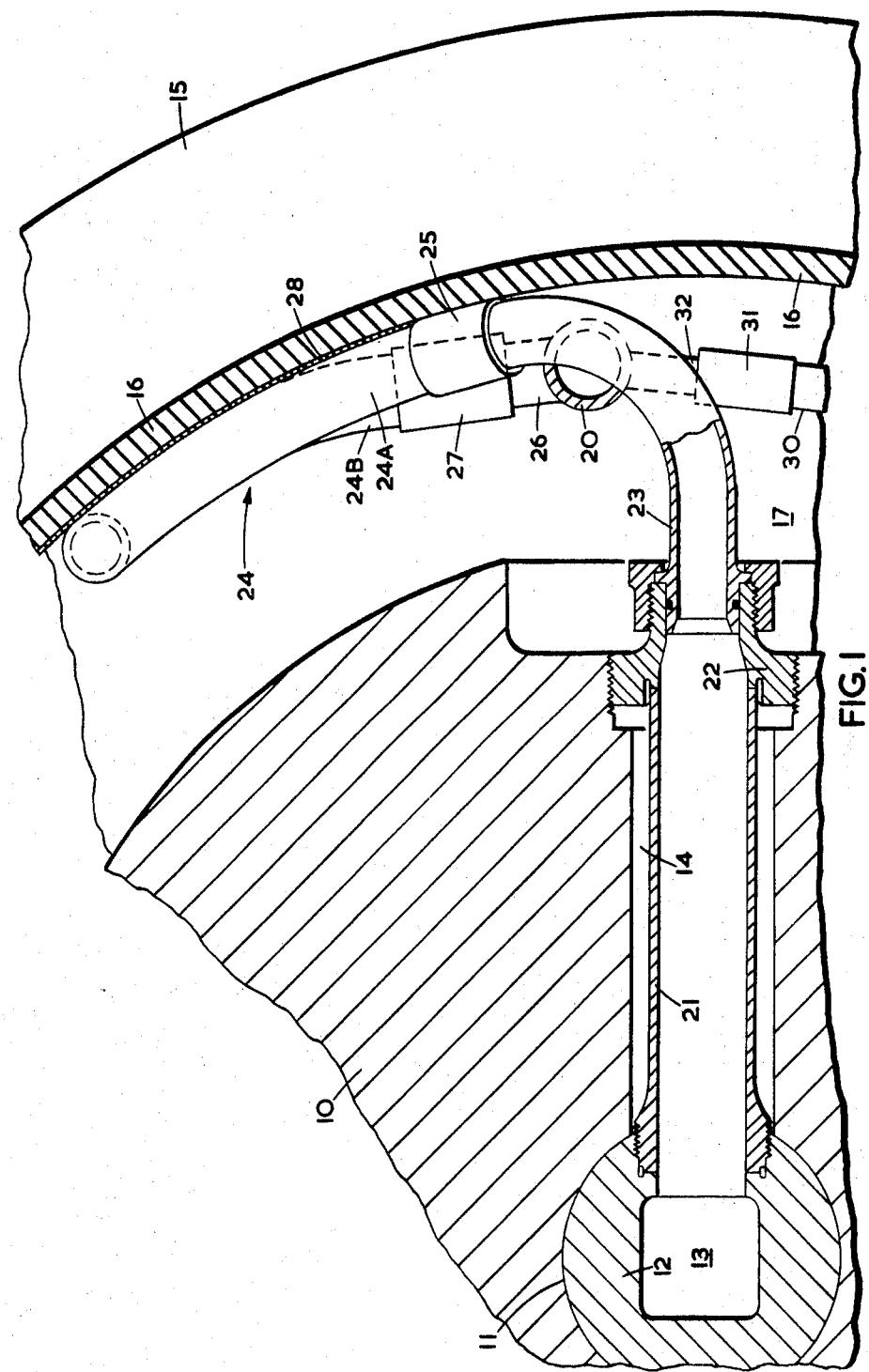
FIG. 1 is a section through a sector of the nondrive end of the rotor shaft end of a large alternating current generator.

In FIG. 1 various references show standard parts of the rotor of a large alternating current generator at the nondrive end of the shaft end thereof and include:

the steel rotor shaft end 10;
an axial bore 11 in the shaft end;
a stainless steel bore liner 12 with a central axial duct 13;
a radial duct 14 connecting with the central axial bore 11;
the rotor winding end turns 15;
an annular space 17 between the inner face of the end turn insulation 16; and
the outer face of the shaft end 10.

The usually massive steel end bell which embraces the rotor winding end turns is not shown in the drawings.

The arrangement at the drive end of the rotor is generally the same as described above.

From the axial duct 13 coolant is supplied to an axially extending manifold 20 through a stainless steel riser 21 which is positioned in the radial duct 14 and which has one end screwed into the bore liner 12 as shown. The other end of the riser 21 is supported near the outer face of the shaft end in a threaded collar 22 and communicates with the interior of that collar. The outer end of the collar 22 communicates with a short elbow section of stainless steel pipe 23 of the arcuate shape shown. The other end of the pipe 23 is connected with one end of a flexible pipe 24 by means of a connector 25 and the other end of the pipe 24 is connected to the manifold 20 by a short section of a stainless steel pipe 26 and a connector 27.

The flexible pipe 24 which is made of P.T.F.E. tube reinforced with braided stainless steel is arcuate so that it lays circumferentially about the insulation 16 on the inner face of the rotor winding end turns and at the same time it extends axially along this insulation. That is, it extends axially of the rotor shaft end and can be considered as having two arms of which the arm 24A is axially nearer and the arm 24B is axially further away, as seen in FIG. 1. A sheet of electrically insulating material 28 is disposed between the pipe 24 and the insulation 16 and acts as a packing for pipe 24 and is necessary because of the differences in diameter of pipe 24 and connector 25.

The stainless steel pipe 26 preferably connects with the manifold at about the mid point of the axial length thereof and from the manifold liquid is distributed to the rotor winding coils in a number of flow paths each comprising stainless steel pipes 32, connectors 31 and flexible coolant feed tubes 30, all shown in FIG. 1 but more fully described with reference to FIG. 2. At the drive end of the rotor the arrangement for exhausting liquid from the rotor winding coils is substantially the same as described above.

FIG. 4 shows diagrammatically part of the nondrive end arrangements as referred to above, and the reference numerals generally indicate parts which correspond in FIGS. 1 and 2, which latter figure is described later. The long curved pipe 24 having arms 24A and 24B as shown in FIG. 4 better illustrates the shape and form of this pipe.

Figure 2:
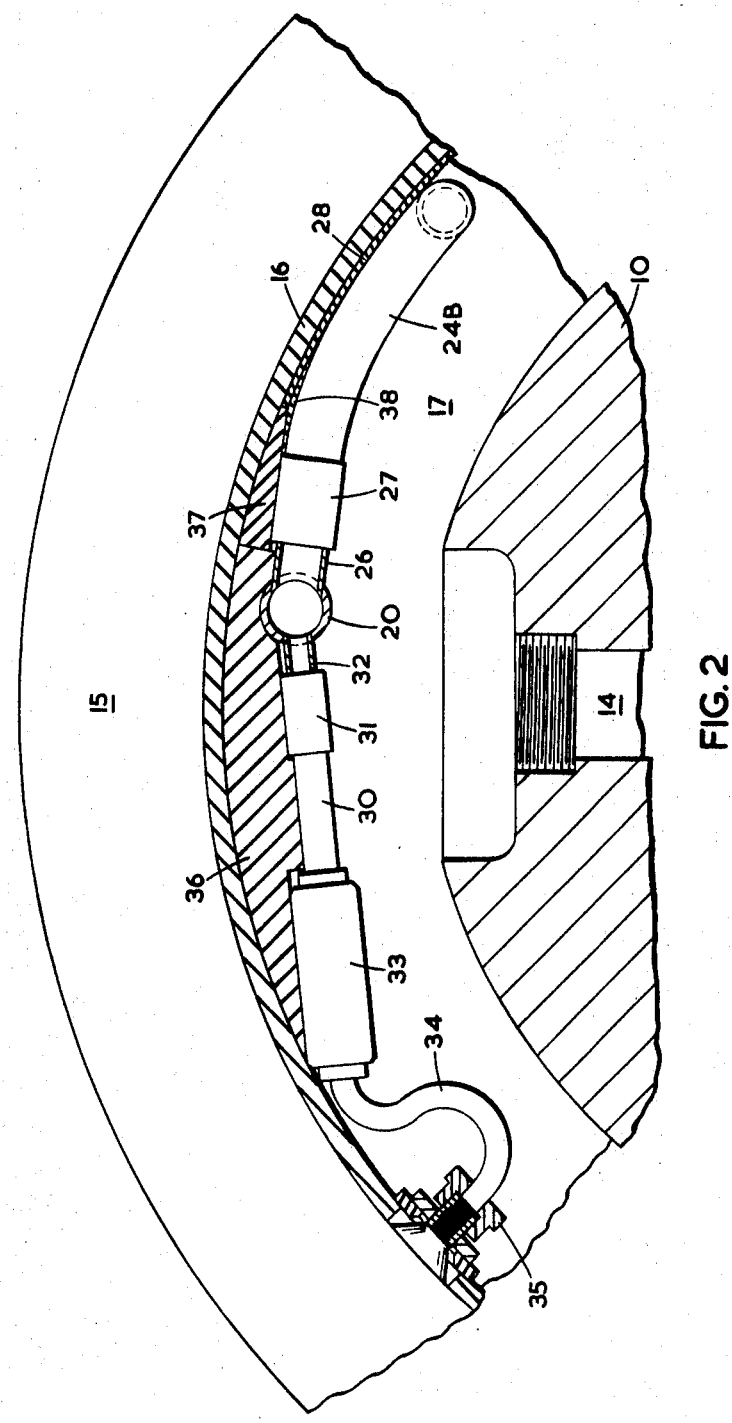
FIG. 2 is another cross section through a sector of the same shaft end but nearer to the rotor body and shows various parts which have corresponding parts associated with FIG. 1 but not shown in that figure.

FIGS. 1 and 2 together show all the parts of a single manifold arrangement (supply or exhaust) but in relation to two different manifolds of which there are four supply manifolds at the nondrive end of the rotor and four exhaust manifolds at the drive end thereof. In FIG. 2 parts which correspond to FIG. 1 are indicated by like reference numerals.

From the manifold 20 liquid is supplied to the rotor winding coils through the stainless steel pipe 32, connector 31 to a flexible feed pipe 30 also made of braided stainless steel and P.T.F.E, to an electrically insulating section 33, a stainless steel pipe 34 and to a rotor winding coil through a connector 35. The insulating sections 33 provide electrical insulation between the shaft end 10 and the rotor windings and between parts of the rotor windings at different electric potentials.

In FIG. 2 it will be seen that there are three electrically insulating packing members 36, 37 and 38 between the insulation 16 and the various parts of the liquid supply system 24A, 24B, 27, 26, 20, 32, 31, 30 and 33. The packing members are supported by the rotor winding end turns 15 which in turn are supported by the end bell (not shown).

Thus the whole liquid supply and exhaust arrangements are held in position in a very simple way and the relative shaft end-end turn movement is accommodated by the pipe 23 which is designed to take the required strain without being highly stressed.

Figure 3:
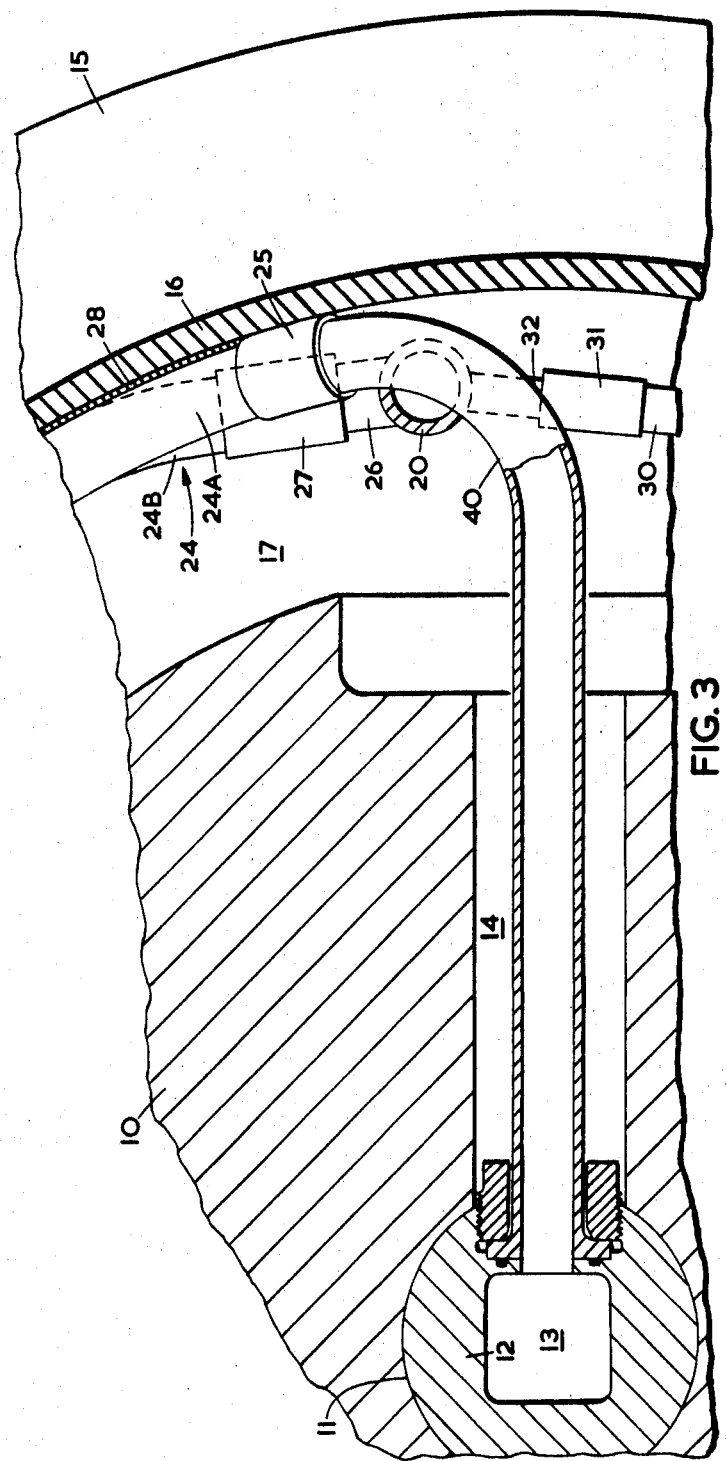
FIG. 3 shows a modification of the arrangement of FIG. 1.

FIG. 3 shows a modification of the arrangement of FIGS. 1 and 2, and in FIG. 3 like references indicate like parts. In this embodiment of the invention, the riser 21 and collar 22 are dispensed with and liquid is conveyed directly to or from the axial duct 13 by a stainless steel pipe 40 one end of which is secured directly into the bore liner 12 and the other end of which connects with the elbow pipe 24 directly at the connector 25. Being longer and more flexible, the pipe 40 will accommodate relative movement between the shaft end and end turns better than the shorter pipe 23 of FIGS. 1 and 2.

I claim:

A liquid cooling system for the windings of the rotor of a dynamoelectric machine in which:
 the end turns of the rotor winding coils form an annular arrangement of coil end turns disposed about but spaced from the shaft end at each end of the rotor, and in which each shaft end has an axial duct therein for the passage of cooling liquid, including, at each end of the rotor, in the space between the shaft end and the coil end turns;
 axially extending manifold pipes supported by the annular arrangement of coil end turns;
 a plurality of first flexible connector means for conveying cooling liquid between each manifold and an associated one of the end turns of the rotor winding coils; and
 second flexible connector means for conveying cooling liquid between the axial duct in the rotor shaft and each axially extending manifold pipe.

2. A liquid cooling system according to claim 1 in which each second flexible connector means includes:
 an arcuate flexible pipe supported by the coil end turns and arranged to extend circumferentially about and axially along the inner face of the end turns, and to have one end adjacent the midpoint of the length of the manifold pipe;
 means for connecting the said one end of the arcuate flexible pipe to the adjacent part of the manifold pipe; and
 flexible connecting means for connecting the other end of the arcuate flexible pipe to the axially extending duct in the shaft end.

3. A liquid cooling system according to claim 2 in which the flexible connecting means includes:
   an elbow pipe;
   means for connecting one end of the elbow pipe to the other end of the arcuate flexible pipe; and
   means for connecting the other end of the elbow pipe to the axially extending duct in the shaft end.

4. A liquid cooling system according to claim 2 in which each first flexible connector means includes:
   a series circuit of connector members arranged in the order;
   a flexible arcuate connector member having one end connected to one coil end turn;
   a rigid electrically insulating connector member;
   a straight flexible connector member; and
   second and third rigid connector members, one end of the third member being connected to the manifold pipe.

5. A liquid cooling system according to claim 2 including:
   a packing means between the inner face of the coil end turns; and p1 the rigid electrically insulating connector means, the straight flexible connector means, the second and third rigid connector means, and the manifold pipe.

6. A liquid cooling system according to claim 4 including packing means between the arcuate flexible pipe and the means for connecting the said one end of that pipe to the manifold pipe.